(12) United States Patent
He et al.

(10) Patent No.: US 6,353,057 B1
(45) Date of Patent: Mar. 5, 2002

(54) CATALYZING CATIONIC RESIN AND BLOCKED POLYISOCYANATE WITH BISMUTH CARBOXYLATE

(75) Inventors: Zhiqiang He, Ridgefield; Werner J. Blank, Wilton; Marie E. Picci, Norwalk, all of CT (US)

(73) Assignee: King Industries, INc., Norwalk, CT (US)

( * ) Notice: Subject to any disclaimer, the term of this patent is extended or adjusted under 35 U.S.C. 154(b) by 0 days.

(21) Appl. No.: 09/247,363

(22) Filed: Feb. 10, 1999

(51) Int. Cl.[7] .................... C08K 3/20; C08L 33/14; C08L 63/02
(52) U.S. Cl. .................. 525/124; 523/415; 524/555; 525/528
(58) Field of Search ................ 525/528, 124; 523/415; 524/555

(56) References Cited

U.S. PATENT DOCUMENTS

| | | | | |
|---|---|---|---|---|
| 4,584,362 A | * | 4/1986 | Leckart et al. | 528/55 |
| 4,786,655 A | * | 11/1988 | Grogler et al. | 528/55 |
| 4,868,266 A | * | 9/1989 | Meckel et al. | 528/55 |
| 5,021,598 A | * | 6/1991 | Patnick et al. | 556/77 |
| 5,670,441 A | * | 9/1997 | Foedde et al. | 502/200 |
| 5,702,581 A | | 12/1997 | Kerlin et al. | 204/486 |

FOREIGN PATENT DOCUMENTS

| | | |
|---|---|---|
| DE | 43 30 002 C1 | 3/1995 |
| DE | 195 32 941 A1 | 4/1996 |
| DE | 196 13 685 C1 | 9/1997 |
| EP | 0 509 437 A1 | 10/1992 |
| EP | 0 810 245 A1 | 12/1997 |
| JP | 3-91520 | * 4/1991 |
| JP | 4-65417 | * 3/1992 |
| JP | 5-155962 | * 6/1993 |
| JP | 9-176570 | 7/1997 |
| JP | 10-218962 | * 8/1998 |
| WO | WO 95/04093 | 2/1995 |
| WO | WO 95/07377 | 3/1995 |
| WO | WO 95/08579 | 3/1995 |
| WO | WO 95/29007 | 11/1995 |
| WO | WO 96/20967 | 7/1996 |
| WO | WO 97/43328 | 11/1997 |

OTHER PUBLICATIONS

W.J. Blank, ACS Proceedings of Polymeric Materials Science and Engineering, 1990; 63:931–935.

Frisch et al., *60 Years Polyurethanes*, 1998, pp. 287–303.

* cited by examiner

Primary Examiner—Robert E. L. Sellers
(74) Attorney, Agent, or Firm—Morgan & Finnegan, LLP

(57) ABSTRACT

A method of catalyzing a cationic coating comprising a cationic resin such as an epoxy resin-amine reaction product or a copolymer of a cationic monomer, and a blocked polyisocyanate, wherein a catalyst is added, said catalyst selected from the group consisting of bismuth carboxylate(s) having a hydrocarbon chain of from 11 to 36 carbon atoms and a molecular weight of from 165–465, and a mixture of a bismuth salt selected from the group consisting of bismuth oxide and bismuth chloride, and a carboxylic acid having a hydrocarbon chain of from 11 to 36 carbon atoms and a molecular weight of from 165–465.

11 Claims, No Drawings

CATALYZING CATIONIC RESIN AND BLOCKED POLYISOCYANATE WITH BISMUTH CARBOXYLATE

INTRODUCTION

The present invention is directed to a method of catalyzing the process for de-blocking blocked isocyanates to form crosslinked coatings. More particularly, the present invention relates to the use of certain bismuth carboxylates that are effective in catalyzing both a solvent borne and a waterborne process to form such crosslinked coatings.

The bismuth carboxylates of the present invention are useful at a very low concentration of 0.05–0.5 wt % of metal based on the total resin weight and are highly effective. This is very desirable in that the emission into the environment of bismuth, a low toxicity metal, is reduced to very low levels.

BACKGROUND OF THE INVENTION

Blocked isocyanates have been used in many coating applications, such as powder coatings, electrocoatings, coil coatings, wire coatings, automotive clear topcoatings, stone chip resistant primers, and textile finishes. Traditionally, these coating processes employ organic solvents, which may be toxic and/or obnoxious and cause air pollution. In recent years, the legal requirements for low or no pollution of the environment have led to an increase in the interest in waterborne and high solids coatings.

In processes wherein blocked isocyanates are used, heating to an elevated temperature is necessary to remove the blocking group from the blocked isocyanate to form free isocyanates. The free isocyanates then react with polyols (polymers containing hydroxy functional groups) to form a crosslinked network as a thin film coating. An obstacle to the use of this process is the high temperature required to remove the blocking group. The process is extremely slow without a catalyst. It is known that metal compounds such dialkyltin and certain bismuth and zinc salts are excellent catalysts in these solvent borne coating processes. "Crosslinking with Polyurethanes." W. J. Blank, *ACS Proceedings of Polymeric Materials Science and Engineering* (1990) 63:931–935.

Bismuth organo-compounds have been used in a variety of processes wherein polyisocyanates or blocked isocyanates is an ingredient. For example, EP 95-109602 describes an epoxide amine adduct with a bismuth compound as being useful in a conventional cationic coating process. U.S. Pat. No. 5,702,581 describes the use of organic bismuth complexes in phosphate dip coating compositions to provide corrosion resistance. The bismuth organic complexes include bismuth carboxylates, such as bismuth lactate. WO 95/29007 disclosed the use of bismuth compounds/mercapto complexes for curing polyisocyanate organic solvent compositions. The bismuth compounds disclosed include bismuth carboxylates, nitrates and halides. WO 96/20967 also described bismuth/zinc mixture with a mercapto complex as a catalyst for producing polyurethane. See also Frisch et al., "Novel Delayed-Action Catalyst/Co-catalyst system for C.A.S.E. Applications", 60 *Years Polyurethanes*, Kresta et al. ed., Technomic: Lancaster, Pa. 1998, pp. 287–303. Further, WO 95/08579 described bismuth/mercapto complexes as latent catalysts in a polyol-polyisocyanate adhesive system. The catalyst is described as useful in promoting the rapid cure of the system. The bismuth carboxylates described in these references are those wherein the carboxylate has ten carbons or less in the hydrocarbon structure. These conventional bismuth carboxylates do not provide improved resin performance nor are they effective in waterborne formulations.

WO 95/07377 described the use of bismuth lactate in cationic lacquer compositions, which employ urethane reactions. A mixture of bismuth and an amino acid or amino acid precursor was disclosed for catalyzing a cationic electrodeposition of a resin film on a metal substrate. The bismuth may be present in the form of nitrates, oxides, trioxides, or hydroxide. DE 19,532,294A1 also disclosed bismuth carboxylates as catalysts for single component polyurethane lacquer coatings in a solvent borne formulation.

Unfortunately, when the known bismuth catalysts are employed in waterborne coatings formulations, it was found that they were not effective. It is suspected that the loss of activity is related to the hydrolysis of the bismuth salt in water. Moreover, even if these compounds function as catalysts in waterborne processes, it has been our experience that a very high level is necessary, usually 10 to 100 times higher than in solvent borne processes. This is undesirable because bismuth has a low degree of toxicity and would cause environmental pollution if a large amount is released into the environment.

Bismuth carboxylates have been used as catalysts in processes that do not involve de-blocking of blocked isocyanates. Bismuth dimethylol propionate has been disclosed in DE 93-43,300,002 as being useful in an electrocoating process for coating phosphate dipped metals to provide anti-corrosion and weather resistance. Bismuth carboxylates are also described in DE 96-19,618,825 for use in an adhesive gel formulation that is safe for contact with human skin. The formulation contains polyether polyols with hydroxy groups, antioxidants, Bismuth(III) $C_2$–$C_{18}$ carboxylates soluble in the polyether polyols and $OCN(CH_2)_6NCO$. JP 95-351,412 describes the use of bismuth neodecanoate as a catalyst for two part adhesive formulations containing polyisocyanates, polyols with an ethylenediamine. These formulations do not involve the de-blocking of blocked isocyanates.

For waterborne processes, the catalysts known to be useful are organo-tin and lead compounds. See WO 95/04093, which describes the use of organo-tin alone or in a mixture with other compounds including bismuth oxide in a low temperature curing process employing blocked isocyanates. There is no disclosure of bismuth carboxylates alone as a catalyst for de-blocking isocyanates. Organo-tin compounds have also been used in coatings, e.g. in paints for anti-fouling applications. Organo-tin compounds in mixtures with bismuth hydroxy carboxylic acid salt was described in DE19,613,685. The use of bismuth lower carboxylates was described as being useful in a phosphate dip process to provide corrosion resistance to lacquer coatings. The bismuth carboxylates described therein as being useful are lower carboxylate of bismuth wherein the carboxylic acid has up to ten carbons. The substrate is then coated with an epoxy resin in the presence of a blocked isocyanate as the crosslinking agent using a zinc organo compound and/or lead compound as the catalyst. EP0,509,437 disclosed a mixture of a dibutyltin aromatic carboxylate with a bismuth and a zirconium compound as the dissociation catalyst for electrocoating wherein a blocked isocyanate is used. Polystannoxane catalysts are also described in EP0,810,245 A1 as an low temperature catalyst for curing compositions comprising a blocked isocyanate. Bismuth compounds, including carboxylates were described as being useful as a co-catalyst. However, the process is one in which the reaction temperature was in the range of 100° C., quite a bit below the normal temperature of 120° C. to 150° C. for de-blocking blocked polyisocyanates. JP 94-194950 described a formulation for coating materials which are rapidly curable in contact with an amine catalyst vapor or mist. The coating formulation included polyols, polyisocyanates, antimony or bismuth catalysts with mercaptans in an organic solvent. The toxicity of both lead and tin compounds present serious environmental hazards The use of solvents in solvent borne processes further result in the undesirable release of toxic and obnoxious chemicals into the environment. For these reasons, the use of organo tin and lead compounds and solvents has been banned in many applications and is highly restricted in electrocoating.

It is, therefore, important to develop other catalysts or catalysts systems for waterborne processes.

SUMMARY OF THE INVENTION

Certain bismuth carboxylates have now been developed as effective catalysts for coatings processes wherein a temperature of at least 130° C. is used to de-block blocked isocyanate employed as the crosslinking agent. The bismuth carboxylates of the present invention are compounds wherein the carboxylate is derived from a carboxylic acid with more than ten carbon atoms. The bismuth carboxylates of the present invention have been found to be highly effective and efficient catalysts and are useful at very low concentrations both in solvent and water-borne processes. Thus, even though bismuth has a low toxicity, the low concentrations required reduces the emission of bismuth into the environment and thus reduces environmental contamination.

An objective of the present invention is to develop catalysts, which are effective, and efficient for de-blocking blocked isocyanate to form crosslinked coatings with reduced environmental contamination.

It is a second objective of the present invention to develop catalysts, which may be used at very low concentration levels to reduce the emission of toxic substances into the environment.

It is a further objective to develop a catalyst, which is highly effective not only in solvent borne processes, but retains its high effectiveness in waterborne coating compositions.

It is another objective to reduce the emission of metals into the environment.

In accordance with the present invention a process has been developed for forming blocked isocyanate crosslinked coatings formulations comprising as a catalyst, a bismuth carboxylate, wherein the carboxylate is derived from a carboxylic acid with a linear or branched hydrocarbon chain of 11–36 carbons. The hydrocarbon chain may contain heteroatoms such as nitrogen, oxygen or sulfur. The carboxylic acid may be aromatic or aliphatic, such as: undecanoic, dodecanenoic, palmitic, stearic, oleic, isostearic, abitiec acids. The carboxylic acid may be synthesized or derived from natural fats. The catalyst may also comprise a mixture of the carboxylic acids useful in the present invention.

DETAILED DESCRIPTION OF THE INVENTION

In accordance with the present invention a catalyst for crosslinked blocked isocyanate coatings has been developed. The catalyst comprise a bismuth salt of a hydrophobic carboxylic acid having 11–36 carbon atoms in the hydrocarbon chain and a molecular weight in the range of 165–465. Preferably the carboxylic acid suitable for the present invention is water-insoluble.

The carboxylic acid salts of bismuth of the present invention is prepared by heating 1M of bismuth trioxide, $Bi_2O_3$, with at least 3M of a carboxylic acid or an anhydride and removing the water from the reaction mixture. The reaction is carried out at a temperature of 120–150° C. for several hours or until a clear solution is obtained. The bismuth carboxylates of the present invention are known to be unstable in the presence of water. They are hydrolyzed and break down into their constituent parts: bismuth oxide and the carboxylic acid from which they are formed. However, surprisingly, on heating to 130° C., the bismuth carboxylate reforms and is highly effective as a catalyst.

This catalyst is also effective in solvent borne coatings, which contain low levels of water, such as in pigmented coatings. Furthermore, the bismuth carboxylates of the present invention are stable and have a longer shelf life.

The catalytic activity of the bismuth catalysts useful in the present invention can be maintained if the salt is prepared from a hydrophobic, carboxylic acid having 11–36 carbons in the hydrocarbon chain. The hydrocarbon chain may comprise non-carbon atoms, such as nitrogen, oxygen or sulfur. The carboxylic acid may be aromatic or aliphatic with a molecular weight in the range of 165–465. The carboxylic acids useful in the present invention are water-insoluble. In a water-borne electrocoating process, the cationic resin codeposit with the hydrolyzed bismuth carboxylate of the present invention as a mixture of bismuth oxide and carboxylic acid. When heated to a curing temperature of 130° C. or above, the bismuth carboxylate forms in situ to catalyze the process.

The carboxylic acid salts of bismuth may be prepared by heating one mole of bismuth trioxide ($Bi_2O_3$) with at least 3 moles of a carboxylic acid or an anhydride and removing the water formed. The reaction is carried out at a temperature of 120–150° C. for 1 to 5 hours or until a clear solution is obtained. The bismuth carboxylate catalysts of the present invention are effective in both solvent borne and water borne coatings. It is particularly useful in pigmented coatings.

The bismuth carboxylates of the invention may be used singly or in combination as mixtures. To form a mixture of the carboxylates, a mixture of carboxylic acids or anhydrides may be used in the process. The carboxylates may also be prepared in situ, i.e. a mixture of a bismuth salt such as bismuth oxide or chloride with carboxylic acid, singly or in mixtures may also be incorporated into the coating formulation.

Cationic water-borne resins or cationic electrocoating resins useful in this invention can be typically prepared by reacting a bisphenol A type epoxy resin with an epoxy equivalent weight of between 200 to 2000, preferably between 400 to 1000 with an amine. The amine can be ammonia, a secondary, primary or a tertiary amine. If ammonia is used in the preparation of the cationic resin, the reaction of the epoxy resin with ammonia has to be conducted in the presence of large excess of free ammonia to suppress gelation of the resin. In this reaction a combination of primary, secondary and tertiary amine functional resin is formed. With primary amines, depending on the ratio of amine to epoxy secondary, and tertiary amine functional resins are formed. With secondary amines tertiary amine functional resins are produced. If an excess of epoxy is used and if the reaction is conducted in the presence of some water and neutralizing acid, there is also the potential for the formation of quaternary ammonium group containing resins.

Another way to prepare cationic resins is by co-polymerization of cationic monomers such as dimethyl-amino-propyl-methacrylate, dimethyl-amino-ethyl-methacrylate, dimethyl-amino-propyl-acrylamide or t-butyl-amino-ethyl-acrylate with an acrylic or methacrylic ester monomer or optionally with styrene or acrylonitrile. Other methods are the reaction of anhydride functional polymers with amines with primary or secondary and t-amine groups and a mono epoxide compound as shown in U.S. Pat. No. 3,984,382.

If a waterborne formulation is desired, an alcohol or a polyol can be solubilized or dispersed in water in the presence of nonionic groups or a nonionic surfactant. The alcohol or polyol may be incorporated in the bisphenol epoxy resin itself. For example, a bisphenol epoxy resin can be reacted with a methoxy-polyethylene glycol or a methoxy-polyethylene-ether-amine with a MW of between 500 to 2000.

Waterborne resin formulations suitable for this invention may also include resins dispersed in water in the presence of a nonionic surfactant. An epoxy or an acrylic or polyester resin may be dispersed in water. The nonionic groups can be a part of the resin structure or a part of an external surfactant. Commercial products, which are suitable, include a dispersion in water of solid bisphenol A glycidyl resins with a molecular weight of between 900 to 4000.

The blocked isocyanate crosslinker useful in this invention are aromatic or aliphatic isocyanates with a blocking group, which can be removed. Often the de-blocking to the isocyanate is a displacement reaction, wherein the blocking group is displaced with another group. Typical blocking groups for the isocyanate are selected from the group consisting of malonates, triazoles, $\epsilon$-caprolactam, phenols, ketoxime, pyrazoles, alcohols, glycols, glycol ethers and uretdiones.

Some typical di or polyisocyanates suitable for the invention are: hexamethylene diisocyanate, isocyanurate trimer, biuret, isophorone diisocyanate, tetramethylxylidine diisocyanate and methylene bis(phenyl isocyanate). Typical examples of blocking groups are methyl ethyl ketoxime, $\epsilon$-caprolactam, 1,2,4-triazole, 3,5-dimethylpyrazole, phenol, 1,2-ethylene glycol, 1,2-propylene glycol, 2-ethylhexanol, 2-butoxyethanol, 2-methoxy (2-ethoxy ethanol).

The cationic resins suitable for the invention may also be typically dispersed in water in the presence of a suitable water soluble organic acid such as formic, acetic, glycolic or lactic acid or an inorganic acid such as sulfamic acid.

A coating formulation is normally prepared by blending and dispersing the blocked isocyanate crosslinker, the cationic resin and the catalyst of this invention in water. If pigments are added they can be dispersed separately in the resin. If neutralization of the cationic resin with an organic acid is required, the acid can be added to the resin or to the water phase. Usually high shear dispersers are used to emulsify or disperse the resin.

The catalyst of this invention is also advantageous for use in solvent borne coating formulations. Most pigmented formulation have shown a decrease of catalytic activity on aging. This reduction in catalyst activity is attributable to the presence of water on the surface of the pigment. Based on experience, it is known that catalyst deactivation takes place if the coating formulations are cured at high humidity. Although the catalyst of the present invention is predominately suitable for waterborne or water-dispersed coatings. It would be advantageous to use a catalyst with a long shelf life in solvent borne coatings, such as a catalyst of the present invention.

The present invention further includes a coating formulation comprising of polyol, a blocked isocyanate crosslinker and a bismuth carboxylate catalyst. The coating formulation can contain varying amounts of water, depending on the desired application. The bismuth carboxylates of the present invention is a salt of bismuth and a carboxylic acid with a total of between 11 to 36 carbons or a mixture of bismuth oxide or chloride with a carboxylic acid with a total of between 11 to 36 carbons. The carboxylates of the present invention are soluble in a water-immiscible solvent.

The present invention is further directed to a cationic electrocoating formulation comprising a water-dispersible cationic polyol, a blocked isocyanate and a bismuth catalyst of the present invention.

The water-dispersible cationic polyol is at least di-functional, preferably tri functional or higher. The blocked isocyanate is present at a molar ratio sufficient to facilitate crosslinking. The bismuth catalyst is used at a concentration of between 0.01 to 0.5 weight percent (wt %), preferably between 0.1 to 1.0 wt %, of metal based on the total resin solids in the formulation.

The catalyst may also comprise a bismuth salt, such as an oxide or chloride and not a carboxylate, in combination with a free carboxylic acid to form the bismuth carboxylate of the present invention in situ. The bismuth carboxylate may be made from a single or a mixture of carboxylic acids.

Typical carboxylic acids suitable for the present invention are selected from the group consisting of linear and branched, saturated and unsaturated, aromatic and cycloaliphatic $C_{11}$ to $C_{36}$ mono and di carboxylic acids. Examples of suitable carboxylic acids include undecanoic, dodecanenoic, palmitic, stearic, oleic, isostearic, abetiec acid, etc. These acids can be derived from natural fats or produced synthetically.

The present invention further include coating compositions comprising a polyol, a blocked isocyanate and a bismuth salt of a water insoluble aliphatic, cycloaliphatic or aromatic, carboxylic acid with a total number of carbons in the hydrocarbon chain of between 11 to 36. Optionally, the chain may contain heteroatoms such as oxygen, nitrogen or sulfur. The catalyst of the present invention also includes blends of bismuth salts, such as bismuth oxides and chlorides with the above acids, or a mixture of the bismuth carboxylates as defined above.

The bismuth carboxylate of the present invention is added to the resin blend at a concentration of between 0.01 to 1.0 wt %, preferably between 0.05 to 0.5 wt %, of bismuth metal based on the total resin weight in the formulation. Preferably the resin is in a waterborne cationic electrocoating formulation system.

The following examples are provided to illustrate the present invention and are not meant to limit the scope thereof.

EXAMPLE 1

Preparation of a Cationic Bisphenol A Glycidyl Resin

A cationic resin was prepared by reacting a diglycidylether bisphenol A resin with a secondary amine in accordance with the following formulation.

|  | Weight | Equivalent weight | M | Ratio |
|---|---|---|---|---|
| Bisphenol A epoxy | 117.3 | 540 | 0.217 | 1 |
| Diethanolamine | 22.8 | 105 | 0.217 | 1 |
| 2-butoxyethanol | 29.4 | | | |

A commercially available bisphenol A-epichlorohydrin epoxy resin with an epoxy equivalent weight of 540 were dissolved in 2-butoxyethanol and blended with the diethanolamine (1 equivalent of amine). The reaction mixture was heated to 80° C. for 3 hours and then held over night. The mixture is adjusted with 2-butoxyethanol to approximately 83 wt % solids. This is a cationic resin, which can be dispersed in water.

EXAMPLE 2

Blocked Isocyanate Crosslinker

A polymeric aromatic methylene phenyl isocyanate with an average functionality of 2.5 was reacted with an equivalent amount of 2-methoxy(2-ethoxyethanol) until FT-IR showed a complete disappearance of the NCO groups.

|  | Weight | Equivalent weight | M | Ratio |
|---|---|---|---|---|
| MDI, polymeric | 42.4 | 131 | 0.324 | 1.0 |
| 2-methoxy(2-ethoxyethanol) | 39.6 | 120 | 0.33 | 1.02 |

EXAMPLE 3

Preparation of the Coating 169 parts by weight of the cationic resin of example 1 was blended with 82 parts by weight of the crosslinker of Example 2 and 14.1 parts by weight of a 85 wt % solution of lactic acid in water. A catalyst selected from the following table and added to the mixture in an amount as indicated in the table. 352 parts by weight of de-ionized water was added under high speed agitation to the blend. The blend was permitted to age for 24 hours prior to application. Films were cast on pretreated steel panels at a dry film thickness of 15 micron and baked for 20 minutes at 180° C.

| Catalysts | Metal wt % on total resin | MEK double rubs |
|---|---|---|
| No catalyst | 0.0 | <10 |
| Dibutyltin dilaurate | 0.25 | 10 |
| Dibutyltin dilaurate | 0.50 | 10 |
| Bismuth tris (2-ethylhexanoate) | 0.25 | 100 |
| Bismuth tris (2-ethylhexanoate) + 3M isostearic acid * | 0.25 | 200<br>200 (after 48 hours) |
| Bismuth tris (2-ethylhexanoate) + 1.5M dimeric fatty acid * | 0.25 | 200 (after 48 hours) |

* corresponds to 3 equivalent of COOH per Bi and the dimeric fatty acid is a $C_{36}$ dimeric acid derived from tall oil.

The test results on the coating formed from this formulation clearly illustrates the superior performance of a bismuth carboxylate catalyst in the presence of a non-volatile acid during the baking process.

EXAMPLE 4

A cationic resin was prepared from a diglycidyl ether of bisphenol A in accordance with the following formulation.

|  | Weight | Equivalent weight | M | Ratio |
|---|---|---|---|---|
| Bisphenol A epoxy | 166.3 | 875 | 0.19005 | 1 |
| Diethanolamine | 18 | 105 | 0.17142 | 0.9 |
| 2-butoxyethanol | 67 | | | |

A commercially available bisphenol A-epichlorohydrin epoxy resin with an epoxy equivalent weight of 875 is dissolved in 2-butoxyethanol and blended with the diethanolamine (0.90 equivalent of amine). The reaction mixture is heated to 80° C. for 3 hours and then held over night. The mixture is adjusted with 2-butoxyethanol to approximately 73 wt % solids.

EXAMPLE 5

A blocked isocyanate crosslinking agent was prepared in accordance with the formula in the following table. MDI polyisocyanate was reacted with 2-butoxy(2-ethoxyethanol) at 100° C. for 4 hours.

|  | Weight | Equivalent weight | M | Ratio |
|---|---|---|---|---|
| MDI, polymeric | 51.8 | 131 | 0.395 | 1 |
| 2-butoxy(2-ethoxyethanol) | 66.6 | 162 | 0.411 | 1.04 |

EXAMPLE 6

Coating Formulation 251 part by weight of the cationic resin of example 4 was blended with 118 parts by weight of the crosslinker of example 5 and with 11.5 parts by weight of a 85 wt % solution of lactic acid in water. 618 parts by weight of de-ionized water was added under high speed agitation to this blend. The formulation was aged for 24 hours before application. Films were cast on pretreated steel panels at a dry film thickness of 15 micron and backed for 20 minutes. All catalyzed formulations were formulated with the corresponding catalyst at a concentration of 0.25 wt % metal based on the total resin blend. The catalyst was added to the formulation prior to the addition of water. The coating was applied on phosphate pretreated steel, 15 μ film thickness.

| Solvent resistance Methylethylketone double rubs | | | |
|---|---|---|---|
| Catalyst\Cure Temp., 20 min | 180° C. | 170° C. | 165° C. |
| None | 10 | 10 | 10 |
| Dibutyltin dilaurate | 63 | 30 | 10 |
| Bismuth tris(2-ethyl-hexanoate) | 150 | 70 | 20 |
| Bismuth tris(2-ethyl- | 200 | 150 | 20 |

-continued

Solvent resistance Methylethylketone double rubs

| Catalyst\Cure Temp., 20 min | 180° C. | 170° C. | 165° C. |
|---|---|---|---|
| hexanoate) and 3M of isostearic acid | | | |
| Bismuth tris(2-ethylhexanoate) + 1.5M of oleoyl sarcosine | 200 | 150 | 70 |

This formulation illustrates the substantial improvement in cure response over dibutyltin dilaurate and bismuth 2-ethylhexanoate with 8 carbons. It also illustrates that not only simple carboxylic acids but also a complex acid such as a sarcosine may be combined with bismuth to provide improved cure performance.

EXAMPLE 7

2-Butoxyethanol Blocked Isocyanate

A polymeric MDI isocyanate is blocked with 2-butoxyethanol. No catalyst was used in the following reaction.

| | Weight | Equivalent weight | M | Ratio |
|---|---|---|---|---|
| MDI polymeric | 55.0 | 131 | 0.395 | 1 |
| 2-butoxyethanol | 70.7 | 162 | 0.411 | 1.04 |

The polymeric MDI was mixed with the 2-butoxyethanol and held at 100° C. for 4 hours.

EXAMPLE 8

Coating Formulation 322 parts by weight of the cationic epoxy resin of Example 4 was blended with 125 parts by weight of the 2-butoxyethanol blocked MDI crosslinker of Example 7. 12.9 parts by weight of lactic acid and 589 parts of de-ionized water were added to this blend. The catalyst was added before the addition of water. The formulations with catalyst contained a catalyst level, which corresponded to 0.25 wt % metal based on the total amount of binder (resin and crosslinker). The water was added under high speed agitation.

The coating formulations were cast on iron phosphate pretreated steel and cured for 20 minutes at the indicated temperature. The dry film thickness was 30 micron. Solvent resistance was measured as methyl ethyl ketone double rubs.

| Aging period | 24 hrs | 1 week | 5 days, 0.6 mils thickness | 5 days |
|---|---|---|---|---|
| Cure temp, ° C. | 180 | 180 | 180 | 170 |
| No catalyst | 10 | 10 | 10 | 10 |
| DBTDL | 200 | 80 | 50 | 50 |
| Bismuth tris(2-ethylhexanoate) | 200 | 200 | 100 | 50 |

-continued

| Aging period | 24 hrs | 1 week | 5 days, 0.6 mils thickness | 5 days |
|---|---|---|---|---|
| Bismuth tris(2 ethylhexanoate) and 3M of isostearic acid | 200 | 200 | 200 | 120 |
| Bismuth tris(2-ethylhexanoate) and 3M of oleyl sarcosine | 200 | 200 | 180 | 50 |
| Bismuth tris(2-ethylhexanoate) and 1½M of octadecyl succinic acid | | | 200 | 50 |

EXAMPLE 9

Screening of Potential Catalysts

Other know catalysts for alcohol blocked isocyanates were screened in an acrylic polyol and a MDI polyisocyanate blocked with butyl carbitol formulation. The ratio of blocked isocyanate to hydroxyl was 1/1.

| | Catalyst Me wt % | MEK double rubs | MEK double rubs |
|---|---|---|---|
| Cure temperature, ° C. | | 150° C. | 170° C. |
| No catalyst | 0 | 2 | 2 |
| Dibutyltin dilaurate | 0.18 | 10 | 130 |
| Bismuth tris(2-ethylhexanoate) | 0.18 | 120 | 200 |
| Zn bis(2-ethylhexanoate) | 0.18 | 24 | 200 |
| Al chelate | 0.18 | 20 | |
| Zr chelate | 0.18 | 11 | |
| Ti tris(ethyl acetoacetate) | 0.18 | 13 | |
| Zr bis(2-ethylhexanoate) | 0.18 | 10 | |
| Mn Naphthenate | 0.18 | 10 | |
| Ca bis(2-ethylhexanoate) | 0.18 | 10 | |
| Co bis(2-ethylhexanoate) | 0.18 | 100 | |
| Cr tris(2-ethylhexanoate) | 0.18 | 15 | |

As shown in this screening study only bismuth tris (2-ehtylhexanoate), DBTDL and Zn bis(2-ethylhexanoate) showed any promise of improved performance.

EXAMPLE 10

Comparative Example

A bismuth lactate catalyst was prepare according to Feola et. al. (PCT Int. Application WO 9507377). A bismuth dimethylol-propionic salt catalyst was prepare according to Foedde et. al. (Eur. Pat. Appl. EP 690106). A bismuth catalyst was also prepared from an amino acid (glycine) according to Bethoski et. al. (PCT Int. Appl. WO 9810024).

| Formulation | Parts by Weight |
|---|---|
| Epoxy resin of Example 4 | 251.3 |
| Blocked isocyanate crosslinker of Example 5 | 118.4 |
| Catalyst | 0.25 wt % metal on total resin solids |
| Lactic acid 85 wt % solution in water | 11.5 |

-continued

| Formulation | Parts by Weight |
|---|---|
| De-ionized water | 618.8 |
| Total Formulation | 1000.0 |

Water-based cationic E-coat formulations were prepared by mixing the epoxy-amine adduct and the blocked isocyanate, with various catalysts respectively into each of the resins blends. Each of the formulations was neutralized with lactic acid to pH 5.0 to 6.0. The resin formulation was then emulsified with water to 30 wt % solids content.

The formulations containing the different catalysts were applied after 24 hours on Bonderite 1000 steel panels pretreated with iron phosphate. The cured coatings were evaluated for solvent resistance (methylethylketone double rubs), humidity, corrosion and impact resistance. The results obtained demonstrated the advantage of the catalyst of the present invention over other bismuth carboxylate catalysts at the same metal concentration. The catalyst of the present invention provides a faster cure rate and better humidity resistance than the comparative catalyst examples. The test results clearly illustrate the superior cure behavior in improved solvent and humidity resistance provided. The catalyst of the present invention provided less blistering at a lower cure temperature than the catalysts of the present art.

Solvent resistance (MEK double rubs)

Catalyst amount: 0.25 wt % metal on total resin solids
Cure time : 20 minutes
Substrate : Bonderite 1000 (pretreated cold rolled steel)
Dry film thickness: 0.85 mil

| Cure temp, ° C. | 165 | 170 | 175 | 185 | 190 |
|---|---|---|---|---|---|
| No catalyst | 5 | 5 | 5 | 20 | 190 |
| Bismuth tris(isostearate) | 80 | 125 | 200 | 200 | 200 |
| Bi tris(lactate) | 75 | 85 | 200 | 200 | 200 |
| Bi tris(dimethylol-propionate) | 50 | 82 | 185 | 200 | 200 |
| Bi tris(glycinate) | 5 | 22 | 50 | 90 | 200 |

Humidity resistance Cleveland Condensing Humidity (50° C.)

| Substrate | Bonderite 1000 panels |
|---|---|
| Exposure Time | 312 hours |
| Baking time | 20 minutes |
| Dry film thickness | 0.85 mil |

| Catalyst\Cure temp, ° C. | 170 | | 180 | |
|---|---|---|---|---|
| | Gloss 20°% | % blister | Gloss 20°% | % blister |
| No catalyst | 0.6 | 100 | 45.0 | 45.0 |
| Bi tris(isostearate) | 93.6 | 25 | 92.7 | 0 |
| Bi tris(lactate) | 81.0 | 60 | 83.1 | 0 |
| Bi tris(dimethylol-propionate) | 52.5 | 80 | 89.8 | 0 |
| Bi tris(glycinate) | 2.9 | 95 | 54.9 | 50.0 |

EXAMPLE 11

A coating formulation was prepared according to the formulation in Example 10.

Dry film thickness: 0.6–0.8 mil
Catalyst amount: 0.25 wt % metal on total resin solids
Substrate: Iron phosphate pretreated steel.

| Catalysts\Cure temp ° C. | 190 | 185 | 180 | 175 | 170 |
|---|---|---|---|---|---|
| No catalyst | 90 | 20 | | 5 | 5 |
| DBTDL | | | 63 | | 30 |
| Bi tris(stearate) | | | 200 | | 150 |
| Bi tris(2-ethyl-hexanoate) + 3M Neodecanoic acid | | | 200 | 120 | 70 |
| Bi tris(2-ethylhexanoate) + 3M lauric acid | | | 200 | 185 | 70 |

What we claim is:

1. A cationic coating formulation consisting of a blend of:
   a) a cationic resin selected from the group consisting of
      i) an epoxy-amine reaction product of a bisphenol A epoxy resin with an epoxy equivalent weight of between 200 and 2000 and an amine selected from the group consisting of a primary amine, a secondary amine and a tertiary amine; and
      ii) copolymers of cationic monomers selected from the group consisting of cdimethyl-amino-propyl-methacrylate, climethyl-amino-ethyl-methacrylate, dimethyl-amino-propyi-acrylamicl and t-butyl-amino-ethyl acrylate with an acrylic or methacrylic ester monomer other than the cationic monomers optionally with styrene or acrylonitrile;
   b) a blociced polyisocyanate crosslinker selected from the group consisting of an aromatic and an aliphatic polyisocyanate with a blocking group selected from the group consisting of malonates, triazoles, ε-caprolactam, phenols, ketoxime, pyrazoles, alcohols, glycols and glycol ethers; and
   c) 0.01 to 1.0 wt % metal based on the total weight of the carionic resin blend of a bismuth catalyst selected from the group consisting of:
      i) bismuth carboxylate wherein the carboxylate has a hydrocarbon chain of 11–36 carbons, a molecular weight in the range of 165–465;
      ii) a mixture of bismuth oxide with a carboxylic acid having a hydrocarbon chain of 11–36 carbons, a molecular weight in the range of 16–465; and
      iii) a mixture of bismuth carboxylates wherein each carboxylate has a hydrocarbon chain of 11–36 carbons, a molecular weight in the range of 165–465.

2. A cationic coating formulation according to claim 1 wherein the carboxylic acid is selected from the group consisting of undecanoic, dodecanoic, palmitic, stearic oleic, isostearic and abitiec acids.

3. A cationic coating formulation according to claim 1 wherein b) is a mixture of bismuth tris (2-ethylhexanoate) and a second carboxylic acid which is isostearic acid.

4. A cationic coating formulation according to claim 1 wherein b) is a mixture of bismuth tris (2-ethylhexanoate) and a second carboxylic acid which is a fatty acid selected from the group consisting of oleyl sarcosine and octadecyl succinic acid.

5. A method of catalyzing a cationic coating by adding a catalyst selected from the group consisting of
   a) bismuth carboxylate having a hydrocarbon chain of 11 to 36 carbons and a molecular weight in the range of 165-465;
   b) a mixture of a bismuth salt, selected from the group consisting of bismuth oxide and bismuth chloride, and a carboxylic acid having a hydrocarbon chain of 11 to 36 carbons and a molecular weight in the range of 165–465; and c) a mixture of bismuth carboxylates wherein each carboxylate has a hydrocarbon chain of 11–36 carbons, a molecular weight in the range of 165–465 to a cationic coating formulation consisting of a cationic resin, and a blocked polyisocyanate wherein the cationic resin is selected from the group consisting of:
  i) an epoxy-amine reaction product of a bisphenol A epoxy resin with an epoxy weight of between 200 and 2000 and an amine selected from the group consisting of a primary amine, a secondary amine and a tertiary amine; and
  ii) copolymers of a cationic monomer selected from the group consisting of dimethyl-amino-propyl-methacrylate, dimethyl-amino-ethyl-methacrylate, dimethyl-amino-propyl-acrylamide and t-butyl-amino-ethyl acrylate with an acrylic or methoacrylic ester monomer other than a cationic monomer optionally with styrene or acrylonitrile.

6. A method according to claim 5 wherein the mixture of bismuth salt and carboxylic acid is water insoluble.

7. A method according to claim 5 wherein the bismuth carboxylate is water insoluble.

8. A method according to claim 5 wherein the carboxylic acid of b) contains at least two carboxylic acids.

9. A method according to claim 5, 6, 7, or 8 wherein the carboxylic acid is selected from the group consisting of undecanoic, dodecanoic, palmitic, stearic, oleic, isostearic and abitiec acids.

10. A method according to claim 8 wherein b) is a mixture of bismuth tris(2-ethylhexanoate) and a second carboxylic acid which is isostearic acid.

11. A method according to claim 8 wherein the salt of bismuth and a carboxylic acid is a mixture of bismuth tris (2-ethylhexanoate) and a second carboxylic acid, a fatty acid selected from the group consisting of oleyl sarcosine and octadecyl succinic acid.

* * * * *